(12) United States Patent
Verhaeghe

(10) Patent No.: US 11,016,737 B2
(45) Date of Patent: May 25, 2021

(54) METHOD AND APPARATUS FOR REAL-TIME CONTROL LOOP APPLICATION EXECUTION FROM A HIGH-LEVEL DESCRIPTION

(71) Applicant: (UN)MANNED N.V., Brugges (BE)

(72) Inventor: Filip Leonard Etienne Verhaeghe, Brugges (BE)

(73) Assignee: (UN)MANNED N.V., Brugges (BE)

( * ) Notice: Subject to any disclaimer, the term of this patent is extended or adjusted under 35 U.S.C. 154(b) by 0 days.

(21) Appl. No.: 16/470,714

(22) PCT Filed: Dec. 19, 2017

(86) PCT No.: PCT/IB2017/001700
§ 371 (c)(1),
(2) Date: Jun. 18, 2019

(87) PCT Pub. No.: WO2018/115970
PCT Pub. Date: Jun. 28, 2018

(65) Prior Publication Data
US 2020/0089476 A1    Mar. 19, 2020

Related U.S. Application Data

(60) Provisional application No. 62/436,367, filed on Dec. 19, 2016.

(51) Int. Cl.
*G06F 8/20* (2018.01)
*G06F 8/41* (2018.01)
*G06F 21/57* (2013.01)

(52) U.S. Cl.
CPC .............. *G06F 8/20* (2013.01); *G06F 8/41* (2013.01); *G06F 21/57* (2013.01); *G06F 2221/033* (2013.01)

(58) Field of Classification Search
CPC ... G06F 8/20; G06F 8/41; G06F 21/57; G06F 2221/033
(Continued)

(56) References Cited

U.S. PATENT DOCUMENTS 8,453,105 B2 * 5/2013 Larvet ...................... G06F 8/20
717/101
9,405,515 B1 * 8/2016 Bertram ................... G06F 8/41
(Continued)

FOREIGN PATENT DOCUMENTS

EP     2 587 367     5/2013

OTHER PUBLICATIONS

Pothon, Do-178C/ED-12C versus DO-178B/ED-12B Changes and Improvements, ACG Solutions (Sep. 2012) retrieved from https://www.adacore.com/uploads/books/pdf/DO178C-ED12C-Changes_and_Improvements-Sep2012.pdf on Mar. 30, 2019.*
(Continued)

*Primary Examiner* — Lewis A Bullock, Jr.
*Assistant Examiner* — Theodore E Hebert
(74) *Attorney, Agent, or Firm* — Joshua B. Brady; Nixon & Vanderhye, P.C.

(57) ABSTRACT

The present approach provides a method for safety-critical systems to reduce the required long V development and certification process, into a process that is up to 80% shorter, as well as safer. The present approach creates a pre-certified system, with both pre-certified hardware and pre-certified software. The pre-certified system may be configured to implement a safety-critical software compilation, that contains variables, operations, and template instantiations defining the safety-critical system. This approach eliminates the process below the high-level requirements for the safety-critical software through prior action. To support the configuration, the present approach implements three kinds of
(Continued)

components: variables, operators, and templates that provide input, output and abstracted concepts. A configuration defines a set of variables, operations and template instantiations. A tool is used that takes high-level requirements written in a computer readable format into the configuration.

18 Claims, 9 Drawing Sheets

(58) Field of Classification Search
USPC .......................................................... 717/104
See application file for complete search history.

(56) References Cited

U.S. PATENT DOCUMENTS

| | | | |
|---|---|---|---|
| 2008/0263506 A1* | 10/2008 | Broadfoot ................ | G06F 8/20 717/104 |
| 2011/0023016 A1* | 1/2011 | Khader .................... | G06F 8/20 717/120 |
| 2013/0103250 A1* | 4/2013 | Patankar ............. | G06F 11/3604 701/29.1 |
| 2015/0149747 A1* | 5/2015 | Lee ........................ | G06F 8/4452 712/241 |
| 2016/0359873 A1* | 12/2016 | Chand ................ | G05B 19/0428 |
| 2020/0089476 A1* | 3/2020 | Verhaeghe ................ | G06F 8/20 |

OTHER PUBLICATIONS

International Search Report for PCT/IB2017/001700, dated Apr. 19, 2018, 4 pages.
Written Opinion of the ISA for PCT/IB2017/001700, dated Apr. 19, 2018, 8 pages.

* cited by examiner

METHOD AND APPARATUS FOR REAL-TIME CONTROL LOOP APPLICATION EXECUTION FROM A HIGH-LEVEL DESCRIPTION

CROSS REFERENCE TO RELATED APPLICATIONS

This application is the U.S. national phase of International Application No. PCT/IB2017/001700 filed Dec. 19, 2017, which designated the U.S. and claims the benefit of U.S. Provisional Patent Application 62/436,367, filed Dec. 19, 2016, the entire contents of each of which are hereby incorporated by reference in their entireties.

STATEMENT REGARDING GOVERNMENT SUPPORT

None.

FIELD OF THE INVENTION

The present invention relates to the automation of development and certification high-integrity real-time control systems, such as airborne avionics.

BACKGROUND—INTRODUCTION

Various regulatory bodies require that any aviation system that may be included in an aircraft meet specific certification requirements. Generally, such certification standards are concerned with the approval of software and airborne electronic hardware for airborne systems (e.g., autopilots, flight controls, engine controls). This includes systems that may be used to test or make aviation systems, e.g., hardware or software to be installed on an aircraft. In the United States, for example, the FAA Aircraft Certification Service develops the policy, guidance and training for software and airborne electronic hardware that has an effect on an aircraft. Of particular relevance are the guidance documents DO-178C for software and DO-254 for hardware, that airborne system must comply to.

Similar high-integrity needs, with associated certification standards, exist in other markets, such as spacecraft, automotive, train, maritime, nuclear and medical domains.

The development and certification of software-intensive systems for these markets is extremely labor intensive. Steps include building planning documents that explain in detail how the applicant will comply with guidelines on development, verification, configuration management and quality assurance, and which standards the applicant will use for requirement writing, modelling, design, and coding. The system requirements are refined into a set of high-level requirements for the software and for the hardware. For software, these are further refined into an architectural design that can achieve the high-level requirements. Next, low-level requirement are developed that specify how to implement the high-level requirements within the context of the architectural design. These low-level requirements must be detailed enough such that testing these requirements will cover all aspects of the code. The source code is developed to comply with the low-level requirements. Source code and design are reviewed, requirements are tested until all decision points are covered, or even every condition inside each decision point is tested. The amount of work before coding starts is significantly larger than the coding itself, but the verification dwarfs all of the development work.

For hardware, the focus is more on the design but especially when using VHDL, the amount of work is similar.

These standards are in place to maximize the probability of error-free code, and indeed software developed this way has been working safety for decades. For safety reasons, it is a good idea to keep the process at least as rigorous as it currently is.

However, from a practical point of view, the amount of avionics in an aircraft is on an exponential scale. Almost all aircraft are delayed to market, or have very long market lead times, due to the enormous, and rapidly rising, amount of work it take to prove the correctness of an aircraft.

Tools and methods have been developed to reduce the work. Authorities have provided guidelines on how to correctly automate some of the development and verification objectives. Tool vendors have created tools, such as automatic code generators. When qualified, the generated code does not need to be reviewed. However, since testing is against requirements, and coding is only a smaller part of the overall project, these tools have an important but overall minor effect on the time to market of new aircraft.

Code generation tools typically use a graphical design environment, which often is under the hood converted into a higher-level computer language, which is compiled into source code, typically C, C++ or Ada.

Other approaches are to provide frameworks and libraries that are pre-certified. Typical examples are network stacks, visualization libraries, and other input/output libraries. These can help to reduce the amount of development, but again focus mostly on the reduction in coding and low-level requirements, and not on the rest of the process.

Taking the graphical library framework concept one step further, the ARINC 661 specification (*Cockpit Display System Interfaces To User Systems*) concept defines a definition file, which is a configuration file that allows to define the widgets on the screen. It also defines a communication protocol. The idea is to create a generic graphical application that receives displays information and updates this information that it receives over a communication channel. This result of this approach goes one step beyond using a graphical library, in the sense that the user application no longer has to care about the visualization. However, this comes at the cost of supporting a communication protocol, and the capabilities of the ARINC 661 system are well-defined but relatively limited and non-evolving.

Finally, some applications simply implement the entire application, and use a configuration table to configure their operation. A typical example is an airborne network router that takes a routing table to configure its operation. In these examples, the certified avionics device can be configured without recertification, but the function of the application is fixed.

BRIEF SUMMARY

Described herein are systems and methods of developing and certifying safety-critical systems. The process for creating safety-critical applications is a long V for both the development and certification process. Systems and methods according to the present approach reduce the development and verification process to just the top level, either automatically generating or making unnecessary the rest of the V, which leads to a T-shaped process that is up to 80% faster, as well as inherently more safe due to reduced human error capability.

The present approach creates a pre-certified system, with both pre-certified hardware device and pre-certified software. The pre-certified system is configured to implement a critical system compilation, that contains variables, operations, and instantiations defining the safety-critical system. This approach effectively eliminates the development and certification process below the high-level requirements for the safety-critical software through prior action. The present approach can be configured to match the needs of most instruments that can be build using the input/output offered by the embodiment.

To support the configuration, the present approach implements three kinds of components: variables, templates and operators. Variables are a memory space that can store data, like a number, text or a list, amongst others. A template can handle input, or handle output, or both, or perform another system function, or do nothing at all. A template has fields that control the function of template or provide outputs from the template. An operator has no internal state, but simply calculates the result from its operands. Each template and each operator has a unique identifier. The present approach provides templates and operators that match the needs of the high-level requirement writer.

To configure the present approach, a configuration is made that defines set of variables, template instantiations and operations, amongst other information, for the safety-critical software. Templates are instantiated by referencing the template identification and providing a variable for each field. The instantiation is itself stored in a variable. Operations identify an operator, the result variable, and the operand variables.

To make configuration using these building blocks intuitive, and to provide a higher level of abstraction that matches the system requirements level, a tool is used that takes high-level requirements written in a computer readable format (e.g. the Sol Requirement Language), and converts it into a granular configuration for the embodiment. The present approach obtains the configuration at boot, for instance by reading the configuration file, or by any other means that gets the configuration into the computer's memory.

The performance of the templates and operators on the present embodiment can be measured, and these measurements can be used to automatically calculate the Worst-Case Execution Time for the configuration provided.

Embodiments of the present approach may take the form of a safety-critical system development and certification process. Safety-critical systems have safety-critical software configured to operate on a certified hardware device. A safety-critical system may be an airborne safety critical system, or a ground-based aviation support system, for example. The device may, for example, be an instrument panel or display unit, such as may be installed on an aircraft. Under the present approach, an operator and template database may be generated that defines operators and templates. Each operator may have an operator identifier, and generally represents at least one of a logical manipulation used in the safety-critical software, a mathematical manipulation used in the safety-critical software, and a manipulation of operands used in the safety-critical software. Generally, each template may have a template identifier, and represents at least one of an input channel of the safety-critical software, an output channel of the safety-critical software, and an abstraction of a concept and computational functionality of by the safety-critical software. An abstraction may be useful for logic and/or concepts not naturally represented as an operator. In embodiments, each template may have at least one of an input field identifying behavioral properties of the template, and an output field identifying results of the template.

Under the present approach, embodiments generate a safety-critical software compilation having a plurality of variables, a plurality of operations, and a plurality of instantiations, the variables, operations, and instantiations defining the operation of the safety-critical software. A PDIF, as described below, is an example of a safety-critical software compilation. A safety-critical software compilation may also take the form of a plurality of constructors expressed in at least one of source code and object code. As used in a safety-critical software compilation, a variable has a variable identifier and at least one data element specified in the safety-critical software, an operation has an input variable identifier, an operator identifier, and an output variable identifier, and an instantiation has a template identifier and a plurality of field variable identifiers. At least a portion of the variables in the plurality of variables comprises a data type and an initial value, depending on the embodiment. In some embodiments, each operation is configured to apply an operator to an input variable and generate an output data stored as an output variable. At least one instantiation may be configured to apply a template with at least one field and generate an output field stored in local memory.

The present approach also employs a pre-certified application configured to execute the safety-critical software compilation on the certified hardware device, using the operator and template database. It should be appreciated by those of ordinary skill in the art that a pre-certified application may vary from one embodiment to the next. Finally, the present approach allows for certifying the safety-critical software using the pre-certified application, the safety-critical software compilation, and the certified hardware device. In embodiments using a PDIF as a safety-critical software compilation, at least one of a template and an operator is implemented in hardware, resulting in at least part of the safety-critical hardware being configured by at least part of the PDIF. The present approach thus drastically improves the efficiency of developing and certifying safety-critical systems.

In some embodiments, the safety-critical software compilation includes a plurality of loops, each loop defining at least one input instantiation, at least one operation, and at least one output instantiation, and is configured to run the defined input instantiation, the defined at least one operation, and the defined at least one output instantiation. The pre-certified application may be configured in some embodiments to buffer inputs received after the input instantiation of a first loop iteration until the input instantiation of a second loop iteration. In some embodiments, the pre-certified application may be configured to protect from change variables generated by one loop that are used by another loop while said variables are used by the second loop.

In some embodiments the safety-critical software compilation may define a plurality of ticks, each tick configured to use variables from a prior tick, receive inputs, calculate operations, prepare outputs, transmit outputs, and wait for a subsequent tick. The step of receiving inputs may include setting at least a portion of the plurality of variables (e.g., assigning a data value for one or more variables), preparing outputs may include generating data resulting from a calculation of an operation, and transmitting output may involve sending data as an output, such as to an internal bus, internal storage, or another loop.

In some embodiments, an operand used in an operation in a tick may be configured to remain unchanged during the tick. In this manner, the value of that operand is static during the tick. In some embodiments, receiving an input may involve changing one or more variables once per tick. In some embodiments, each tick may be configured to wait after preparing a first plurality of outputs until the next tick, before transmitting said outputs, and is configured to protect from change the outputs prior to transmitting said outputs. Some embodiments may include attaching a signal a variable, and an operator or a template may be configured to set the signal to indicate failure. Using a signal in that manner allows for a template to trigger a global signal upon receipt of a variable having an attached signal set to indicate failure. In some embodiments, at least one operator may be configured to propagate the signal to a result variable when the variable having an attached signal is used as operand.

Worst Case Execution Time is an important measurement for safety-critical systems. Embodiments of the present approach may be configured to measure the performance of operators and templates, and calculating Worst Case Execution Time from operations and instantiations.

DESCRIPTION

Figure 1:
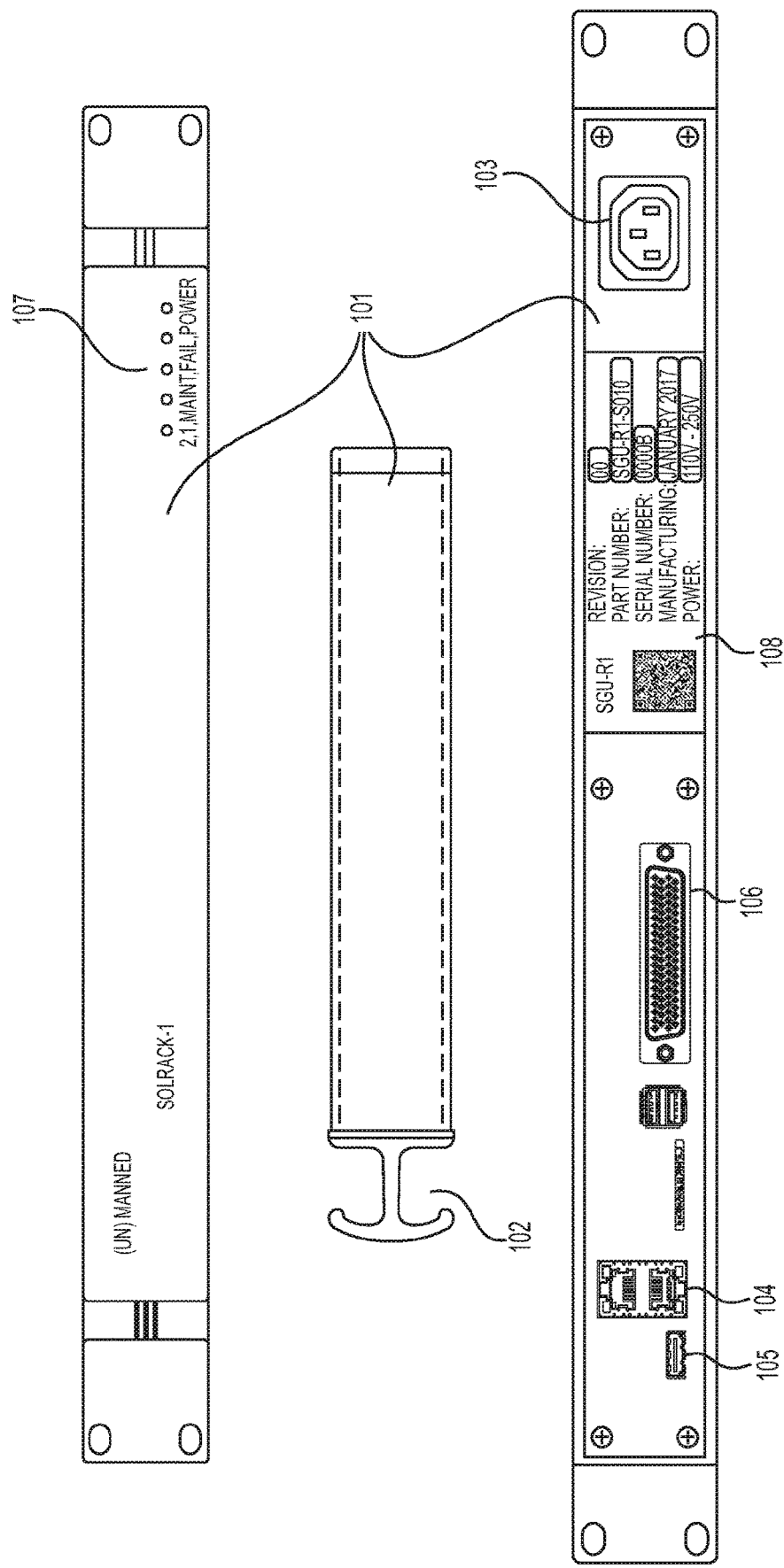
FIG. 1 illustrates an embodiment of the present approach for ground systems.

The following description is of the best currently contemplated mode of carrying out exemplary embodiments of the invention. The description is not to be taken in a limiting sense, and is made merely for the purpose of illustrating the general principles of the invention. Embodiments described are from avionics systems, but it should be appreciated that the present approach may be applied to safety-critical systems in other industries.

An avionics system is a combination of hardware and software, as used in aerospace or space for safety-critical functions. Safety-critical avionics systems are deployed in aerospace to control key aspects of the aircraft, such as the instruments of the pilot, the motors, the flaps, the rudder and the wheels. Many auxiliary safety-critical systems are developed to support these, such as position sensors, altitude measurements, etc.

What makes safety-critical systems special relative to critical electronic systems in non-safety critical industries, is that safety-critical systems are deemed so critical that they need to be proven correct before first use, because any malfunctioning equipment has a high probability to cause injury or loss of life. Safety-critical industries are aerospace, space, trains, cars, some of the medical equipment, and parts of the nuclear facilities. Before avionics is used, it must be certified before government agencies, and shown to comply to the applicable standards. At the most abstract level, these standards indicate acceptable error rates. For instance, the probability that a single event can upset the key instruments of an aircraft pilot must be shown to be less than 1 in a billion (probability of $10^{-9}$). In-depth safety analysis methods will be used to statistically prove this probability for hardware based on known component failure rates and providing hardware redundancy measures to overcome single event upset, and software will be designed to work around identified vulnerabilities of the hardware. The software itself will be developed according to rigorous principles. Compliance to these guidelines is mandated and checked by the government, such as the FAA in the USA and EASA in Europe.

Safety-critical systems are always hard real-time systems, in the sense that they must respond in a predictable time, every single time. Software design goes to great lengths to ensure that under all possible circumstances, the system responds in the predefined time. The safety critical systems do not necessarily need to respond fast, they simply need to respond on time. For some avionics, for instance some control aspects inside the engine, the allowed response time is 1 millisecond. For other avionics, the response time can be as much as one hundred milliseconds. In both cases, the response may never be later than the required response time.

Because of these properties, safety-critical software can never be developed in isolation of the hardware. The performance and capabilities of the software is strongly linked to the hardware, the hardware must provide safety features to protect the software, and the software must design to take advantage of these features. At the same time, the software must monitor and work around any vulnerabilities that are present in the hardware.

As such, certification is always performed on a system, and never on hardware or software in isolation.

Certification has many aspects, including the compliance to minimum operational standards and other guidelines. There are also guidelines for the design and development of hardware and same for software. These guidelines provide design assurance levels (DAL), from E (no oversight) to A (highest criticality). Our proposed method is applicable to all criticality levels.

In software, no library or piece of code with a lower design assurance level may be integrated into a software solution, unless very special containment measures are taken (know as time and space partitioning). In practice, none of the typical software libraries can be used, which excludes any standard library of the C language, or any other library that was not specifically designed for aerospace certification. Additionally, any change in either the hardware or in the software automatically triggers re-certification, unless a change analysis can prove there is no impact. Such proof is possible when changing something small like a hardware resistor on the board, but it is usually not possible for software changes.

Adding to the certification complexity is the fact that the complexity of safety-critical systems is rising quickly. Studies show that the complexity of aircraft onboard avionics onboard aircraft doubles on average every 2 years. This enables safer ways to operate the aircraft, address new threats, as well as higher efficiency of the aircraft, or provide new capabilities to aircraft, such as unmanned aircraft operations.

To cope with all of this complexity, the state-of-the-art in the industry is to re-use as much as possible the existing instruments, to overcome the massive effort to obtain certification for new or modified instruments.

In the ideal case, the entire instrument can be re-used. This is why many aircraft use the same instruments, and often aircraft use instruments that are not ideal for that aircraft, but are good enough and the most/only cost-efficient way of obtaining the instruments. This approach also results in a very slow evolution in instrument features for the established instruments.

If complete re-use is not possible because new features are needed, re-use of hardware is relative common. Many instruments need the same set of inputs connectors/protocols, output connectors/protocols, storage and computing capabilities.

Re-use of the software that runs on top of this re-used hardware is typically achieved in one of two ways, or a combination of both.

First, common software is placed in a library that is tailored to the current hardware embodiment. This can include device drivers, operating system aspects, visualization libraries, and routines to monitor the safety aspects of the hardware, amongst others. The application can be designed and coded to take advantage of these libraries to reduce the software development and certification effort.

The second way is to design the application in a tool that can automatically generate the source code. There are tools that are specifically qualified for use in aerospace, and this results in the generated code does not need to be reviewed for correctness.

Unfortunately, there is a lot more to the development and certification process than just creating a working application. Design must be built and justified, requirements must be built, and each requirement must be tested. Even with the libraries and the qualified code generation techniques described above, a project is extremely successful if it can automate 30% of the work using these techniques.

The present approach automates as much as 80% of the work, substantially improving the efficiency of the development and certification process for safety-critical systems.

Hardware can be reused, but the most complicated of the software-intensive safety-critical system is building the software for the main function of the avionics instrument. The present approach automates the existing process, as is explained below.

Figure 9:
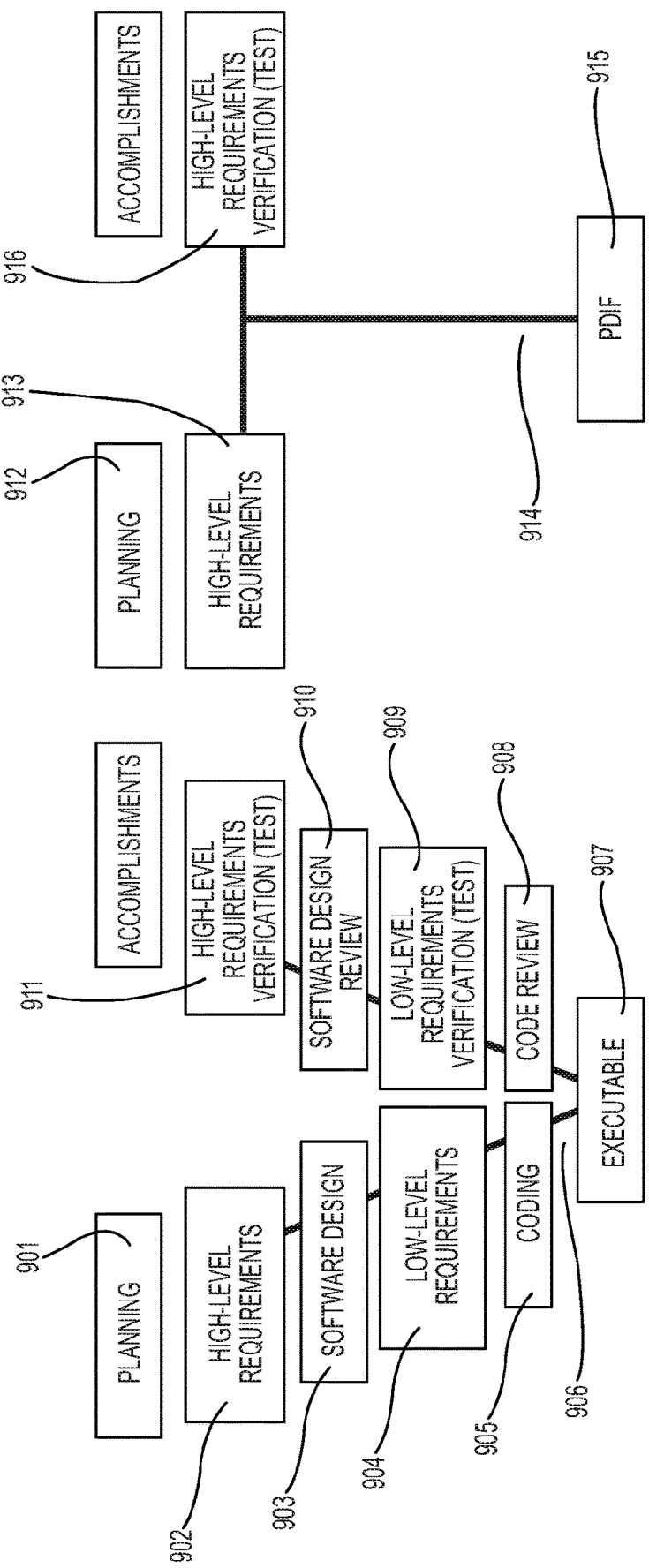
FIG. 9 shows the traditional V-model required to develop, validate and verify a real-time safety-critical instrument (both hardware and software), reduced to a T-model where only the high-level software requirements and high-level integrated tests, and associated plans and accomplishment summaries, are developed.

FIG. 9 shows the traditional V model on the left side (a). Plans on how the software will comply with the safety processes required are written, reviewed and provided to the airworthiness authorities (901).

High-level software requirements (902) are extracted from the overall system requirements. High-level requirements should reflect the system requirements for the instrument. They should only contain aspects that the pilot, copilot, navigator or operator care about, or the system integration requires. High-level requirements do not contain software design decisions, or detailed software-engineering aspects. The high-level requirements are rigorously reviewed by bi-directional checklist against the system requirements.

The software design (903) takes into account the limitations of the embodiment, and in particular the available hardware platform, together with the high-level requirements, to describe how to build a working system. The design will make decisions on operating system usage, library usage, threading, problem decomposition, resource usage, etc. The safety features and redundancy that the hardware offers is a major driver for the software design. The design does not yet provide a detailed description on how each high-level requirement will be implemented, but describes the architecture used to solve the problem. The design is reviewed (910).

Low-level requirements (904) are developed to describe how each high-level requirement can be implemented on the embodiment hardware, in the context of the software design. The hardware aspects that drive the software are mostly related to the detailed features of the hardware, and how to drive this hardware to take advantage of these features. There are typically 10 or more low-level requirements for one high-level requirement. The low-level requirements are not pseudo-code, but describe at a more abstract level what needs to be done, e.g. describing which registers need to be set to which values to achieve the desired effect.

A competent software developer takes these low-level requirements, and turns them into source code (905). Whereas in commercial projects this is the majority of the work, in aerospace projects with high design assurance level, this is typically just 10-20% of the overall project. This shows just how much detailed the other steps are in the described process. All code is reviewed (908) for compliance to the design and low-level requirements, with no unnecessary code present.

Finally, an off-the-shelf compiler is used (906) to convert the source code into executable code (907). Because the compiler is not qualified, the executable is not trusted to be correct.

Verification of the software is not done by testing from the source code, but is instead done by testing the low-level requirements. Coverage of the code is measured to evaluate how good the code complies with the requirements, and whether both the tests and the requirements are sufficiently complete (909).

Finally, black box integration testing is typically used to verify if each high-level requirement (911) is accurately met. All requirement verification, both high- and low-level requirement testing, must test not just the requirement, but also do robustness tests to check how the software responds to out-of-bound values, or hardware failures.

The state-of-the-art in the industry is to reduce this "V" shape into a "Y" shape. Using advanced tools, the low-level requirements are specified in an executable way, and a qualified source code generator automatically generates the real-time source code, typically in C or Ada. Usually, such an approach takes advantage of a wide set of predefined libraries. Because the generator is qualified, the source code does not need to be reviewed. However, because the compiler that turns the source code into an executable application is not qualified, coverage tests are still used to check if the resulting executable complies with the low-level requirements. For each low-level requirement, tests are still built, like before. When successfully applied, the "Y" method can save up to 30% of the overall project work relative to the "V" method.

The present approach employs a novel methodology to achieve valuable efficiencies in the design and certification of safety-critical systems. Our approach proposes the "T" method, shown in FIG. 9 on the right side (b). The high-level requirements are provided (913) in a computer readable way, using a requirement specification language. This may be a declarative programming language, or if can be a graphical method of specification, or it can be a computer-oriented notation such as XML, CSV or any other format that the computer can read, a combination of these methods, or any other way to express the high-level requirements in a computer readable way. These high-level requirements are converted into a binary file (915) using a qualified tool (914). All activities are skipped, and the project can go straight to the black box integration testing of the high-level requirements (916).

Although the high-level requirements are expressed in a computer readable way (913), preferably they should remain high-level requirements. High-level requirements normally contain system design aspects, and it is preferable for these requirements to not contain software design decisions, and preferably these requirements should not contain detailed descriptions on how to achieve a specific function on the target hardware. For instance, it may specify to receive a value from a communication channel, and specify the channel configuration parameters, but should not specify how the communication channel itself works. The present approach may employ one or more tools to read the high-level requirements and generate a configuration file from it.

The generated file is called a Parameter Data Item (PDI) File (PDIF) (915) under the present approach. The PDIF should contain only data, which may be read once at boot time. Normally the PDIF does not contain any information that cannot be automatically proven correct from the high-level requirements. In addition, the PDI file should not include source code, nor require further compilation, nor should it require runtime interpretation, nor should it contain executable binary code. This is necessary because otherwise the certification processes are applicable, with review and verification activities that must be performed, which would disallow the "T" model.

Due to the complexity of the hardware/software interaction to achieve the required safety levels for an embodiment, and the need to verify all of the code against the applicable certification requirements, in the state-of-the-art, the reused instruments are usually very narrowly tuned to their intended function.

Efforts have been made to develop applications that can be tuned after development and certification. Examples from the state-of-the-art include a "display server" (as defined in ARINC 661) was defined that could display received information on the screen. In this case, the reuse is limited to externalizing the visualization. This application under development still needs to follow the "V" model, and the communication with the display server can be as complex as directly displaying the results using a visualization library. However, the system is useful to federate applications, allowing multiple applications to drive a single display by communicating with the display server. The display server uses a binary representation of an XML configuration file, to specify which of its predefined widgets are shown where on the screen. The displayed values and the visibility of the widgets is controlled over a predefined communication protocol.

Figure 4:
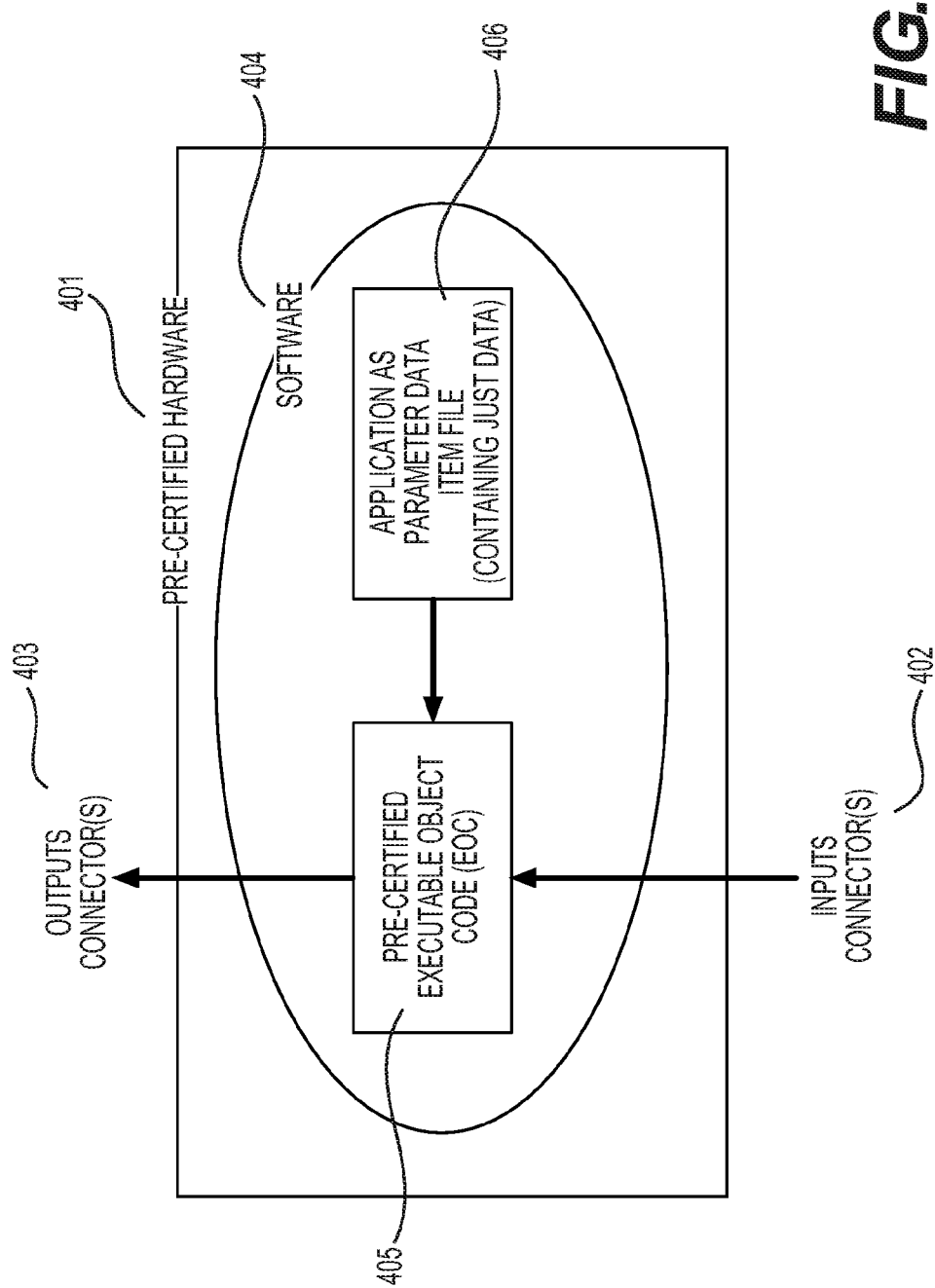
FIG. 4 illustrates how the PDI file combines with the pre-certified software and pre-certified hardware according to an embodiment of the present approach.

To make applications like these possible, the certification standards have introduced the concept of a PDIF. FIG. 4 illustrates how the PDI file combines with the pre-certified software and pre-certified hardware according to an embodiment of the present approach. The pre-certified hardware (401) runs software (404). This includes pre-certified executable code (405), and the PDIF (406) acts as a configuration file for the executable object code. The PDIF may contain only data in some embodiments.

Our proposed method builds on this state-of-the-art. The state-of-the-art display server defines a number of widgets and other screen artefacts that can be used, and provides them with an identifier and a set of fields that can be used to manipulate them. For instance, X and Y are typical fields to define the position of a widget.

The present approach extends this concept by defining templates for a wide selection of the inputs and outputs available in the embodiment. A template is a predefined input or output that can be performed, for instance sending or receiving UDP datagrams over Ethernet. The fields of the UDP socket can contain the UDP port or the list of UDP datagrams to send. The port is a number, and the messages are a list, and both are fields to the template.

The state of the art only contains widgets, which are output templates, and these require only fields to configure the properties of the widgets. However, input templates as defined in this patent application also return the value that is read. In addition, whereas a widget on the screen has little status to report, a more generic output template may need to report back progress or success. As such, we propose that templates have two kinds of fields: in fields which set the properties of the template that control its behavior, and out fields which return the result of the template. An output template can have both in and out fields, and an input template almost always has both in and out fields.

We further propose to extend the concept to more abstract concepts. For instance, the UDP datagram is itself a template with fields such as the destination port and the payload. Another example is a template takes in the raw weather radar information as field in the form of a list of 200 byte binary strings, and provides as result the weather in the form of a bitmap image. Such a template could be placed between the template that receives the weather radar information over physical lines, and the widget template that shows a bitmap on the screen.

Note that abstract concepts can complicate the concept of in and out fields. For instance, when a set of UDP datagram template are provided as a list as the field of a UDP Socket template for reception, then the UDP Socket sets fields in each UDP Datagram. Nevertheless, it remains true that either the operations set the field, or a template instance sets the field, but never both.

The PDIF contains tables of variables, which have an identifier and optionally an initial value and data type. The PDIF contains one or more tables, that identify which templates are instantiated, and identifies for each template which variables are used as its fields. For constant fields, instead of identifying the variable identifier, the value can also provided directly.

In addition to extending the screen-focused widgets to generic I/O templates, we also introduce a completely new set of component to be able to capture the dynamic behavior of the application.

Under the present approach, operators are defined as predefined blocks inside the software, similar to templates. Operators may be embodiment-specific. For instance, some embodiments are capable of providing image processing, whereas others provide only basic operations. Preferably, all operators have a unique identifier.

The present approach defines operations as the identification of a result variable, the identification of an operator, and the identification of one or more operand variables. The PDIF contains one or more tables of operations.

Figure 6:
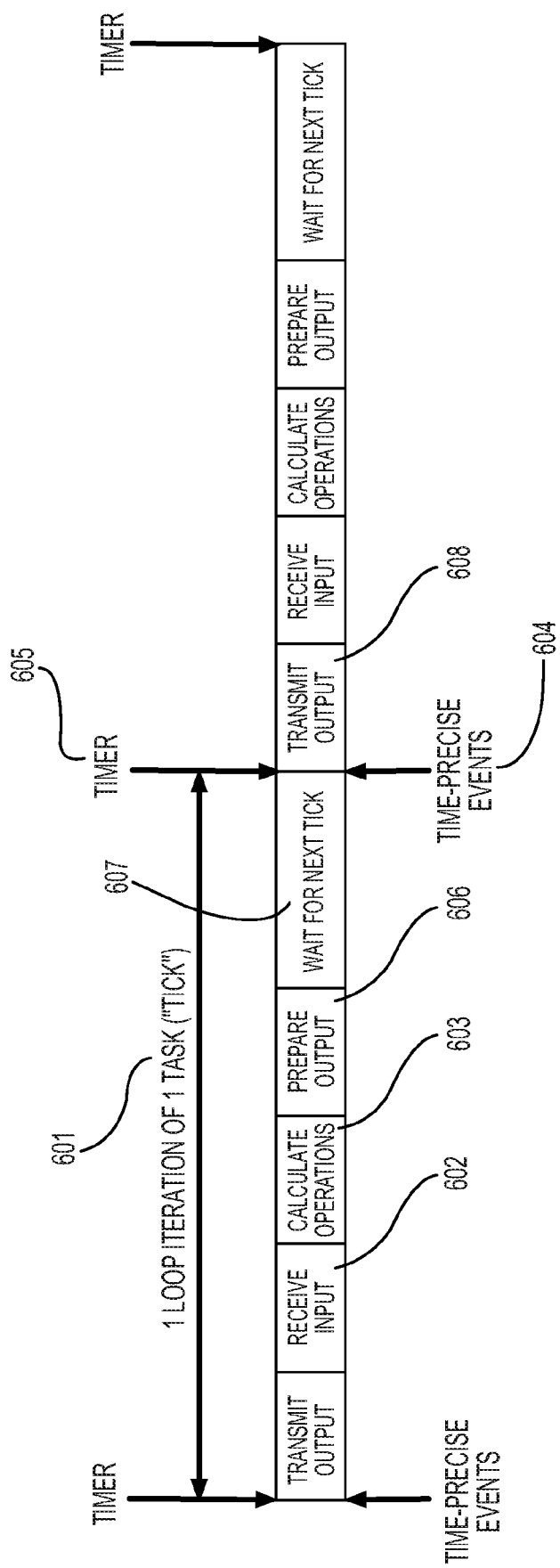
FIG. 6 is a representation of a period loop in task for an embodiment of the present approach.

FIG. 6 is a representation of a period loop in task for an embodiment of the present approach. In order to use the operations in a predictable way, embodiments may employ the concept of a tick (601), where ticks are processed one after the other in a continuous loop. The start of the loop (605) is highly predictable, for instance by using a hardware timer interrupt.

Within a single loop, embodiments first perform those inputs (602) for which templates are instantiated in the PDIF. The pre-certified application is designed to work with the hardware, such that the user can simply assume all inputs are there when the inputs are read. Behind the scenes, hardware buffering with polling, or double buffering with interrupts, is used to keep the inputs on standby after the input reading has been done, up to the point where the next input reading is done.

After the reading is done, all operations are calculated (603). Because operations start either from constants or inputs or other operations, and their result is stored in variables, and these variables are used to set the fields of the outputs, or the fields of the inputs for the next tick, the operations drive the application's dynamic behavior.

After calculations have been performed, the outputs for the instantiated outputs are prepared (606). Safety-critical systems do not need to be faster than the required speed, but they must be work very predictable. Each tick is made every long by inserting a wait period (607) that waits for a highly predictable periodic event (605). The actual transmission is done after this wait period (608). Because all of the outputs have been prepared, the transmission is quickly transferred to the transmitting hardware, leading to a very precise sending out of information (604). A variant is to send the output as soon as it is prepared, which creates a faster responding safety-critical system but with a more widely varying output time, as perceived from a black-box external perspective.

The inputs, calculations, and output can be more interleaved, by starting to calculate as soon as sufficient inputs are in, or preparing output when only part of the calculations are done. However, the following four rules must be followed.

Within each tick, a variable can only be set once in some embodiments of the present approach. This may be considered a first rule for some embodiments. As a result, it cannot be set by two templates, by two operations, or by both a template and an operation.

In some embodiments, within a single tick, an operation may only be calculated when its operands can no longer change within that tick. I.e., the inputs and operations that the current operation is dependent on, have been performed. This may be considered a second rule in some embodiments. This puts the operations in a dependency tree, leading to a highly predictable result. Sometimes, operations have cyclic dependencies. An operation can even depend on itself, as is the case for a state that changes based on its previous state. In these cases, we propose the pre-certified executable ensures, for instance through double buffering, that the previous value of this operation is available as at the start of the tick. Anyone referring to the previous value uses that stored previous value. Note that double buffering may not be necessary if only one operation result depends on its own previous state as operand.

In some embodiments, as a third rule, we propose that within a single tick, an output may only be prepared if all of its fields will no longer change in the current tick.

For some embodiments, as a fourth rule, an input may only use parameters as they were available at the start of the tick, i.e. at the moment the first input reading starts. In practice, that means the inputs are always using configuration fields from the previous tick.

Optionally, predictability of the system can further be improved by requiring that no output out field may be used directly as the in field of an input. This means that only constants or results of operations can set the in fields of an input, which provide more guarantees on the correctness of those in fields.

The concept of a single loop is usually too limiting to develop a safety-critical instrument embodiment. For this reason, embodiments may employ multiple tasks, which each execute their own loop. Each task may have a different tick speed. The tick speeds do not need to be synchronized, although some applications require predictable interactions between tasks, usually implies that one tick rate is a multiple of the other tick rate.

The inputs or operation results from one task's loop may be needed in an operation or output of another task's loop. In some embodiments of the present approach, such interaction is handled as I/O between the two loops: the results of the loop that provides the needed value, provides this value during its output part. The loop that needs to use the value, retrieves the value during its input part. Only the last available value is provided. The value provided can be a list of things.

Embodiments of the present approach achieve this in the form of double buffering, or a similar method, which ensures that the value cannot change while it is being copied from one loop to the next, and also ensures that all values that are transferred from one loop to the other are a consistent set, taken at the same moment (i.e. at the output of the providing loop).

For accumulating lists that are exchanged between loops, special operators are provided allow to "move" items from one loop to the other.

All of these synchronization methods are provided by the pre-certified embodiment of the present approach, the PDIF does not need to specify these aspects. However, the PDIF does need to specify for each template instantiation in which task it is being instantiated. A template can only be instantiated in a specific loop, and remains in that the same loop for the entire run of the instrument. Likewise, an operation is always instantiated in a specific task loop, and cannot change to another loop during the run of the instrument.

The number of tasks may be fixed for a specific embodiment, or it may be determined by the PDIF file for other embodiments.

Embodiments of the present approach provide for safety-critical systems, and as such embodiments often must handle unforeseen conditions explicitly. Such conditions can occur in template instances that encounter issues with the hardware or with the values of the in fields, but they can also occur as part of operations. For instance, an incoming value is unexpectedly zero, and is used as the denominator in a division. Division by zero is not possible, but the airborne instrument should never stop working. It needs to handle the issue, and take an action to remedy it. For instance, the value displayed to the pilot could be replaced by "---" to indicate it is invalid.

In some embodiments of the present approach, the result of an operation, or the out field of a template, can have a signal. A signal is therefore associated with a variable.

When a variable with a signal is used as the operand of an operation, the signal propagates to the result variable.

When the variable that provides the value for an in field of a pre-certified template has a signal at the time the template's I/O is performed, a global signal is set. This global signal can be used to take general actions, such as putting removing all information from the screen and putting a big red cross over the screen.

For a safety-critical application, the Worst Case Execution Time (WCET) is one of the aspects that must be calculated at the time the application is designed. This WCET is compared to the allotted time to validate the timing aspects of the embodiment. The WCET cannot be calculated before loading the PDIF, since the PDIF defines which inputs and outputs are used, and which operations are executed. It is possible for almost all embodiments to specify a PDIF that overruns the capabilities of the central processor. The calculation of the WCET is therefore an activity that is of key importance.

Our method proposes to calculate the WCET as follows:

(n=0:) For each constant variable or value, the WCET is zero. For each template instantiation, an estimate of the template instantiation is taken, based on the template performance on this particular embodiment, and the provided in fields. This estimate can be obtained through a combination of analysis and measurement on the embodiment. Note that the hardware capabilities are very important factors in this measurement.

(n=n+1:) For each operation result, the cumulative computation time for the result can be determined based on performance measurements of the operator on the current embodiment, and the maximum size of the operands. For unconditional operators, the calculated computation of the operands is added to the cumulative computation time. For conditional operators (if-then-else, other select statements), the largest calculated computation of the selectable operands is added to the cumulative computation time.

The worst-case execution time is calculated by going through the operation calculation list as determined through the present approach.

FIG. 1 shows a certified ground-based system for remotely piloted aircraft in an embodiment of the present approach. This a rackmount embodiment (101) with features for easy replacement (102). It accepts normal 110-230V power (103) and communicates over (multiple) ordinary Ethernet cables (104). An external display can be driven via HDMI (105). Protocols typically found in aerospace are still available over a D-Sub connector (106). LEDs (107) provide alternate output signals, including power indication, safety check failure indicators, and more. A label with critical configuration management information (108), including the hardware serial number, is placed on the back. Additional connections can also be provided, for instance HDMI in for picture-in-picture or image processing, USB connectors, and many more.

The shape and number of connectors is can vary. For instance, the same computer is also provided as a desktop system, intended to build into ground control operator consoles.

Figure 2:
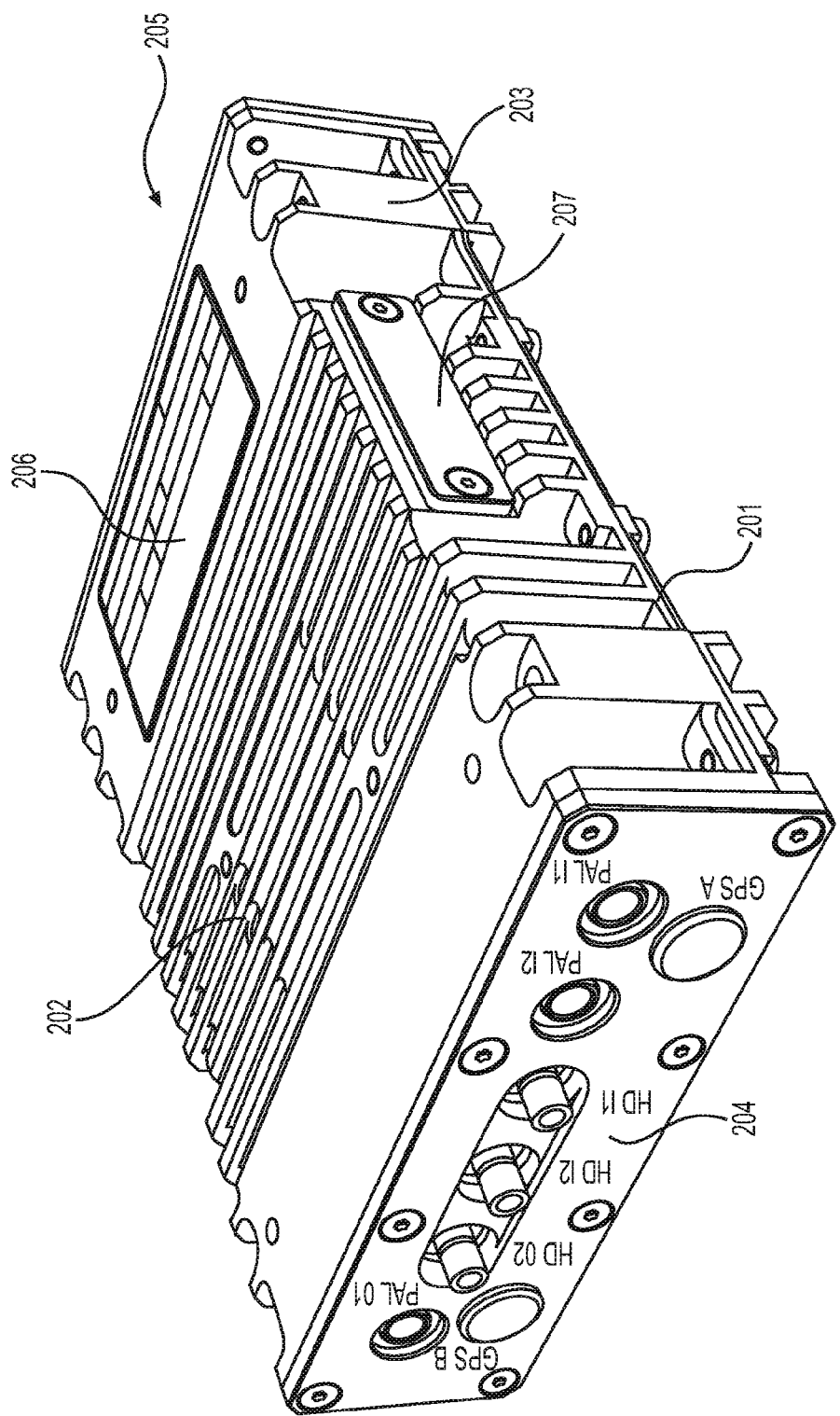
FIG. 2 is an isometric view of an embodiment of the present approach for a non-visual airborne instrument.

For airborne applications, embodiments of the present approach may have very different properties. In FIG. 2, the embodiment illustrated is in sealed housing (201), with a case designed for passive cooling (202), and the ability to tightly screw it (203) inside the aircraft. The connectors are designed to connect firmly with rotational locks (204), in this case tuned to video input/output and positioning system information. Dual power is supplied as 27V (with a wide range) at the back (205). Important configuration management information is provided as a firmly fixed label (206). Maintenance connectors are hidden behind a sealed door (207). Inside the embodiment, the certified hardware runs the certified software.

Figure 3:
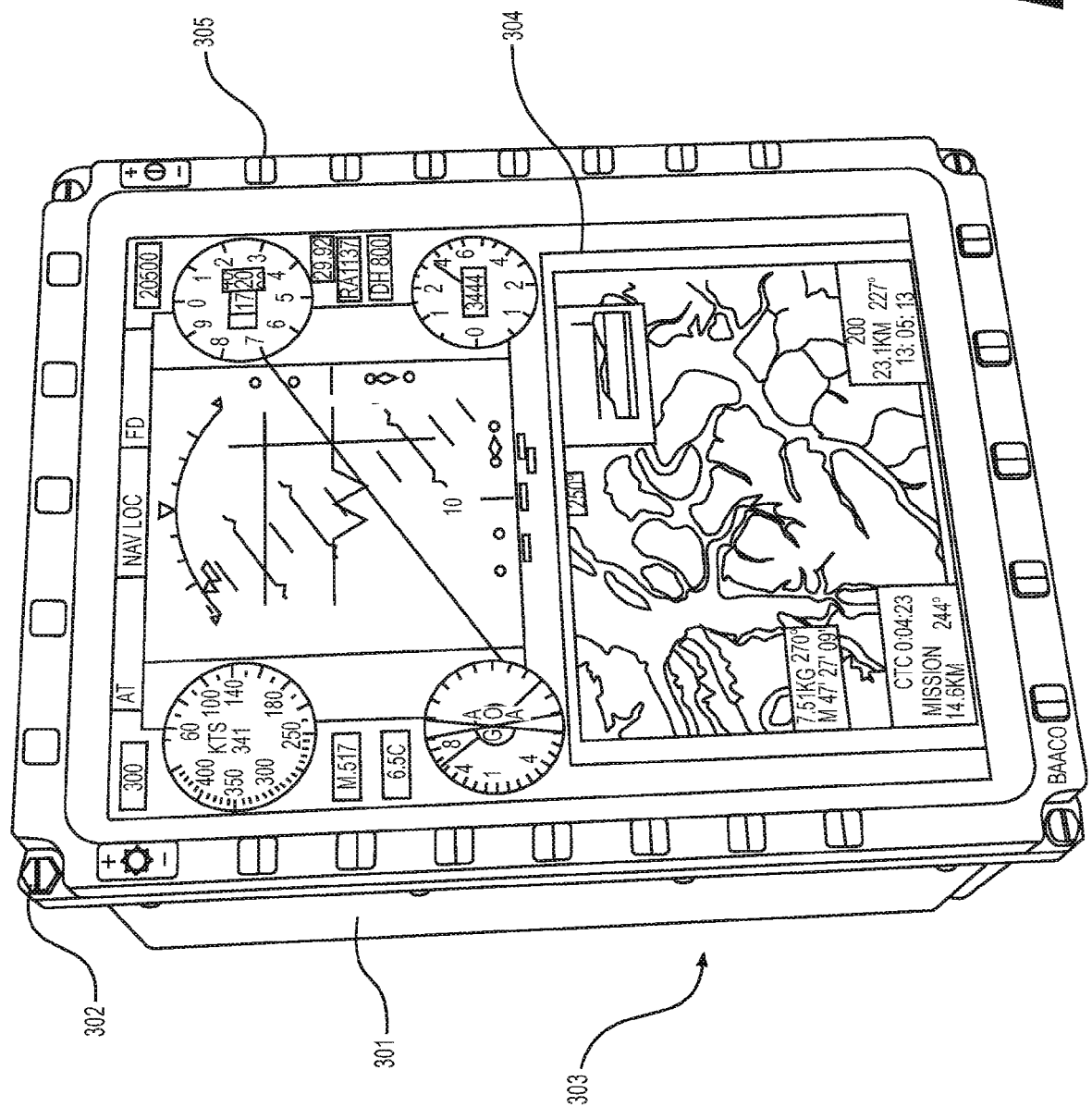
FIG. 3 is an isometric view of an embodiment of the present approach of an airborne system with integrated display.

Some airborne embodiments also have built-in displays as shown in FIG. 3, with an airworthy enclosure (301), screws to firmly place the instrument in place in the aircraft (302), various connectors in the back (303), including power and data, a display at the front (304) and typically also bezel buttons (305), which are typically rotary, rocker or push buttons.

Figure 5:
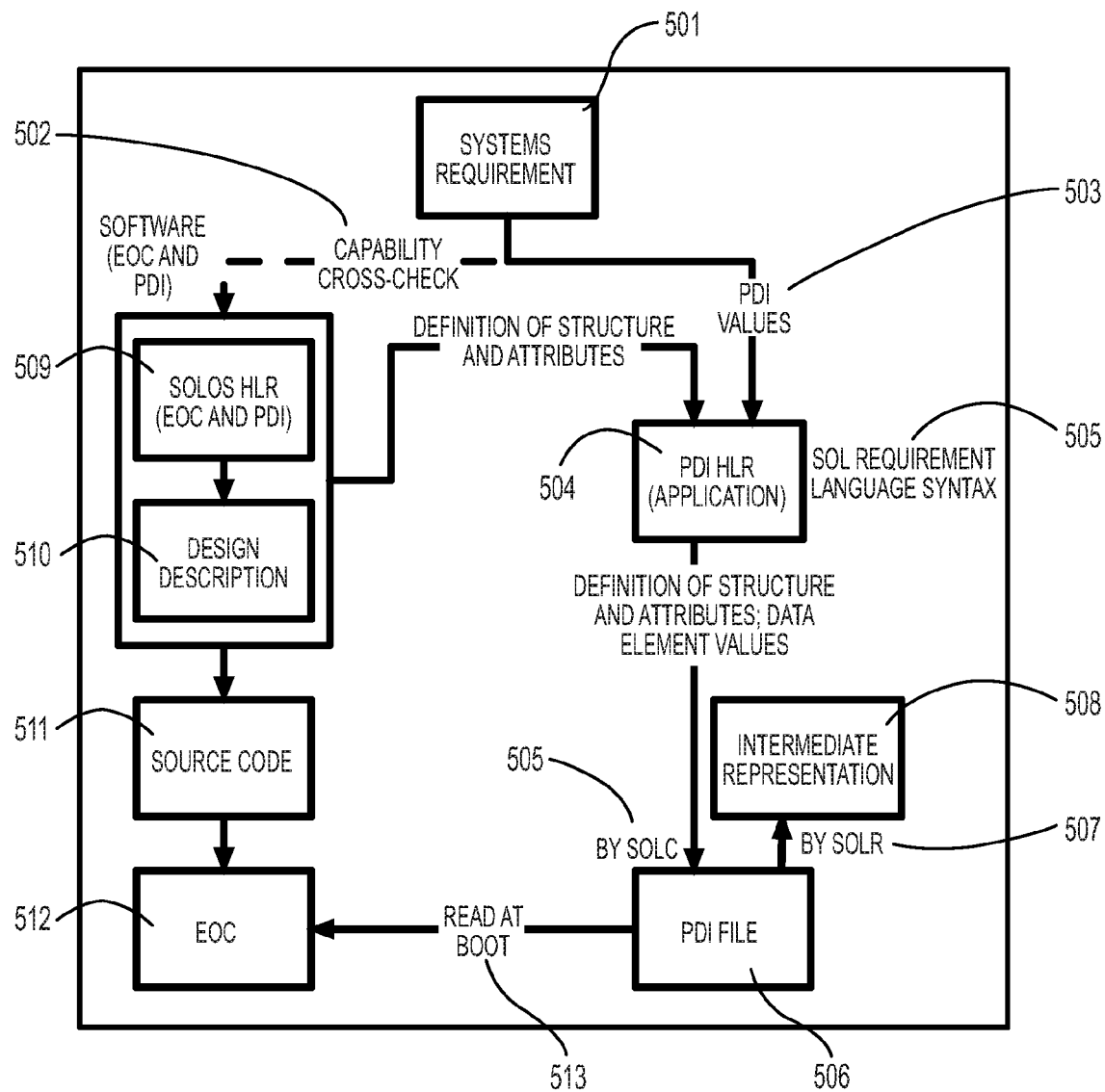
FIG. 5 depicts system requirements allocated to the application and PDI file according to an embodiment of the present approach.

FIG. 5 shows how embodiment achieves the process automation goals (501). First, the system requirements are defined by the overall system, outside of our proposed method. The system requirements have no impact on the software, except that the features of the embodiment must be checked against the system needs (502). In particular, the available inputs, outputs and performance of the embodiment will lead to the selection of an embodiment that complies with the system requirement's needs. The system requirements are mapped on PDI values (503) by writing high-level requirements in a computer readable way (504), such as by using the Sol Requirement Language (505). The high-level requirements are translated into the PDIF concepts by the high-level requirement language compiler (505). The resulting PDIF (506) is loaded at boot (513) by the pre-certified software (512).

The first-time certification of the embodiment follows a traditional process, whereby the embodiment requirements are derived from standards and desirable product features (509). The high-level requirements also define which variable types, templates types and operators are available in this embodiment. The high-level requirements do not derive from, or trace to, the application's system requirements. The high-level requirements are validated through review and verified through integrated tests. An embodiment-specific architectural design is built to enable the desired features, and the low-level requirements complete the design (510). The design is reviewed, and the low-level requirements are verified through testing. Source code is built and reviewed to corresponds to the design (511), and compiled into the pre-certified application's executable object code (i.e. the working application) (512).

Figure 7:
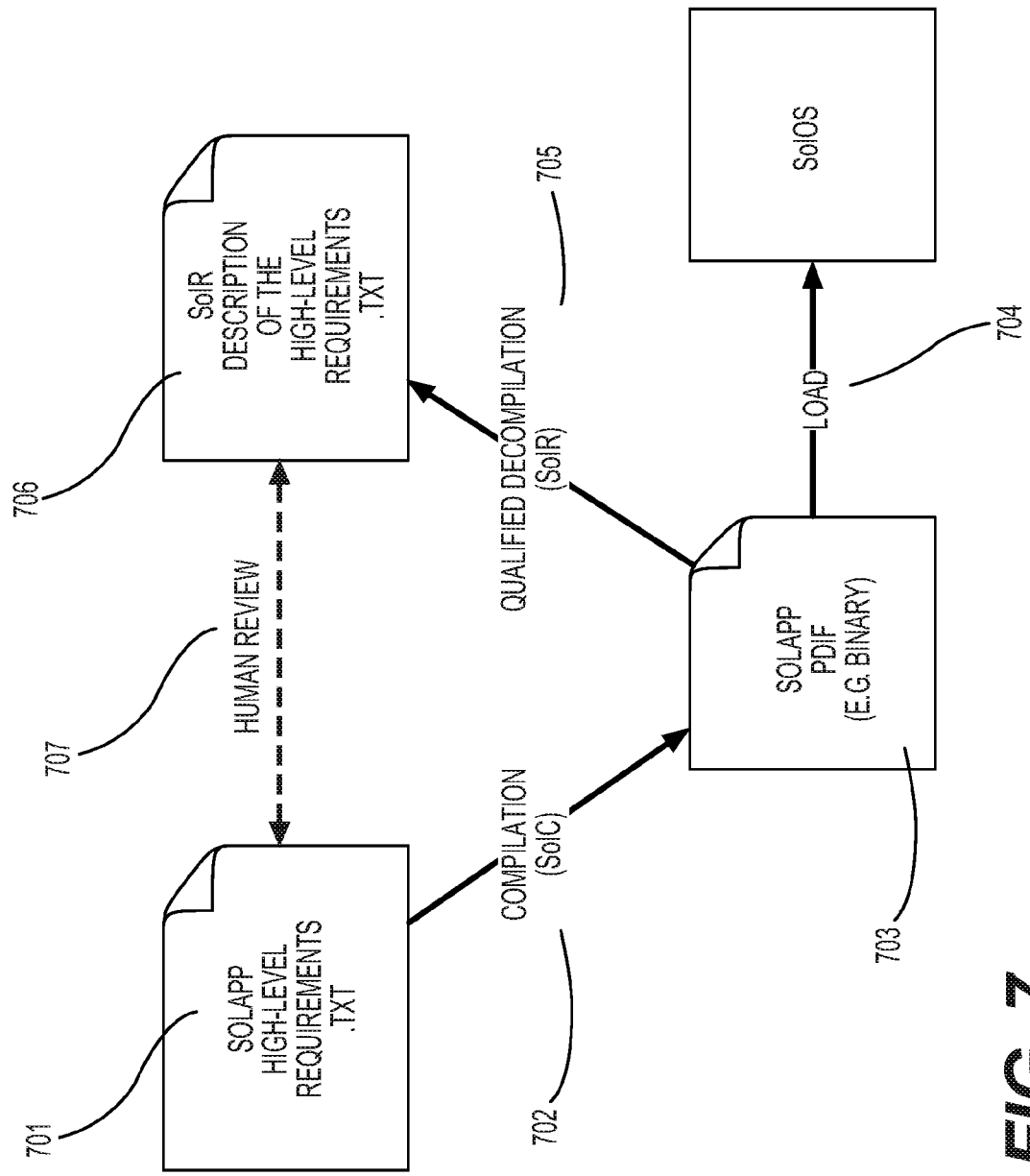
FIG. 7 shows a process of how a user may combine tools to build a PDI file from high-level requirements in an embodiment of the present approach when the compiler is insufficiently qualified.

FIG. 7 shows a process of how a user may combine tools to build a PDI file from high-level requirements in an embodiment of the present approach when the compiler is insufficiently qualified. The present approach provides two methods for ensuring that the PDIF (703), which is built automatically (702) from the high-level requirements (701) and is loaded at boot (704) by the embodiment of the present approach, complies with those high-level requirements.

The first is to develop a qualified reverse compiler (705), which turns the PDIF back into a readable format (706). A human reviewer checks (707) if the reverse compiled output corresponds to the input.

Figure 8:
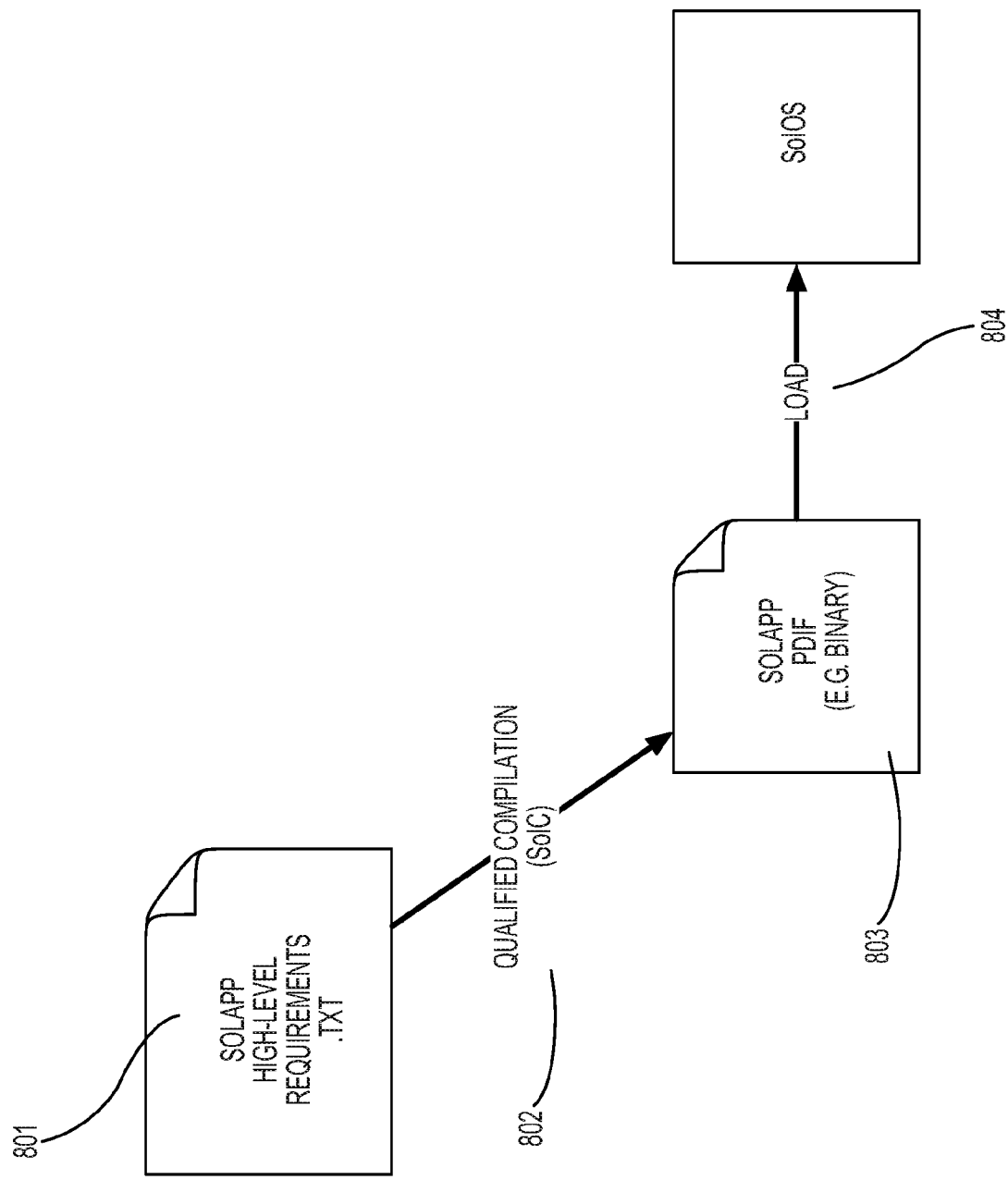
FIG. 8 shows a process for combining tools to build a PDI file from high-level requirements in an embodiment of the present approach when the compiler is sufficiently qualified.

FIG. 8 shows a process for combining tools to build a PDI file from high-level requirements in an embodiment of the present approach when the compiler is sufficiently qualified. This second method is to qualify the compiler that converts (802) the high-level requirements written in a computer syntax (801) into the PDIF (803). This method is very complicated, but the rules to do so are well described by the government.

Embodiments discussed above contemplate the creation of a PDIF as a data-only file. Some embodiments may automatically generate the same information as source code using a variant of the compiler.

A qualified tool auto-generates source code that creates a long list of constructors for the variables, templates and operations. Like the PDIF, this source code does not need to contain decision points, it would just always create all items at boot. All of the checks that are applied to the PDIF at boot can also be applied to this source code. Since the source code is a list of constructors, there is little associated architectural design, and a standard document can be used for all projects. Because the source code does not contain decision points, the testing objectives of the source code degenerates into a single boot test.

In short, we propose our method can also be implemented without PDIF file, using a qualified code generator that writes constructors encoding the content of otherwise found in the PDIF, as source code.

Embodiments discussed above contemplate the configuration of software components. Some embodiments may use the PDIF to configure hardware components. In particular, templates and operators can be implemented in an FPGA where they can be configured using the PDIF. Alternatively, components can be built into an integrated circuit and be activated on demand.

As will be appreciated by one of skill in the art, aspects or portions of the present approach may be embodied as a method, system, and/or process, and at least in part, on a computer readable medium. The computer readable medium may be used in connection with, or to control and/or operate, various pneumatic, mechanical, hydraulic, and/or fluidic elements used in systems, processes, and/or apparatus according to the present approach. Accordingly, the present approach may take the form of combination of apparatus, hardware and software embodiments (including firmware, resident software, micro-code, etc.) or an embodiment combining software and hardware aspects that may all generally be referred to herein as a "circuit," "module" or "system." Furthermore, the present approach may include a computer program product on a computer readable medium having computer-usable program code embodied in the medium, and in particular control software. The present approach might also take the form of a combination of such a computer program product with one or more devices, such as a modular sensor brick, systems relating to communications, control, an integrate remote control component, etc.

Any suitable non-transient computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transient medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach may include computer program instructions that may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc.

Any flowcharts and block diagrams in the Figures illustrate the architecture, functionality, and operation of possible implementations of systems, methods and computer program products according to various embodiments of the present approach. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A safety-critical system development and certification process, the safety-critical system comprising safety-critical software configured to operate on a certified hardware device, the process comprising:

defining a plurality of high-level requirements for the functional operation of the safety-critical software on the certified hardware device;

converting the plurality of high-level requirements into a computer readable format;

generating an operator and template database defining a plurality of operators and a plurality of templates, each operator having an operator identifier and representing a result comprising at least one of a logical manipulation used in the safety-critical software, a mathematical manipulation used in the safety-critical software, and a manipulation of operands used in the safety-critical software, and each template having a template identifier and representing at least one of an input channel of the safety-critical software, an output channel of the safety-critical software, and an abstraction of a concept and computational functionality of the safety-critical software, wherein each template comprises at least one of an input field identifying behavioral properties of the template, and an output field identifying results of the template;

generating, from the computer readable format of the plurality of high-level requirements, a safety-critical software compilation having a plurality of variables, a plurality of operations, and a plurality of instantiations, the variables, operations, and instantiations defining the operation of the safety-critical software on the certified hardware device, wherein a variable comprises a variable identifier and at least one data element specified in the safety-critical software, an operation comprises an input variable identifier, an operator identifier, and an output variable identifier, and an instantiation comprises a template identifier and a plurality of field variable identifiers;

wherein the safety-critical software compilation further comprises a plurality of iterations of a loop, each iteration of the loop defining at least one input instantiation, at least one operation, and at least one output instantiation, and is configured to run the defined input instantiation, the defined at least one operation, and the defined at least one output instantiation; and providing a pre-certified application configured to execute the safety-critical software compilation on the certified hardware device using the operator and template database, thereby achieving high-level requirements for the functional operation of the safety-critical software on the certified hardware device;

wherein the pre-certified application is configured to protect from change variables generated by an iteration of the loop that are used by a subsequent iteration of the loop by buffering inputs received after the input instantiation of the iteration of the loop until the input instantiation of the subsequent iteration of the loop.

2. The process of claim 1, wherein the safety-critical system is an avionics system comprising at least one of an airborne safety critical system and a ground-based aviation support system.

3. The process of claim 1, wherein at least a portion of the variables in the plurality of variables comprises a data type and an initial value.

4. The process of claim 1, wherein each operation is configured to apply an operator to an input variable and generate an output data stored as an output variable.

5. The process of claim 1 wherein at least one instantiation is configured to apply a template with at least one field and generate an output field stored in local memory.

6. The process of claim 1, wherein the safety-critical software compilation comprises a Parameter Data Item File (PDIF).

7. The process of claim 6, where at least one of a template and an operator is implemented in hardware, resulting in at least part of the safety-critical hardware being configured by at least part of the PDIF.

8. The process of claim 1, wherein the safety-critical software compilation comprises a plurality of constructors expressed in at least one of source code and object code.

9. The process of claim 1, wherein the pre-certified application is configured to protect from change variables generated by the iteration of the loop that are used by the subsequent iteration of the loop while said variables are used by the subsequent iteration of the loop.

10. The process of claim 1, wherein the safety-critical software compilation defines a plurality of ticks, each tick configured to transmit outputs from a prior tick, receive inputs, calculate operations, prepare outputs, and wait for a subsequent tick.

11. The process of claim 10, wherein receiving inputs comprises setting at least a portion of the plurality of variables, preparing outputs comprises generating data resulting from a calculation of an operation, and transmitting output comprises sending said data to one of the output of the embodiment, and an internal bus, and internal storage, and another loop.

12. The process of claim 10, wherein an operand employed in an operation in a tick is configured to remain unchanged during the tick.

13. The process of claim 10, wherein receiving input further comprises changing at least a portion of the plurality of variables once per tick.

14. The process of claim 10, wherein each tick is configured to wait after preparing a first plurality of outputs until the next tick, before transmitting said outputs, and is configured to protect from change the outputs prior to transmitting said outputs.

15. The process of claim 1, further comprising measuring the performance of operators and templates, and calculating Worst Case Execution Time from operations and instantiations.

16. The process of claim 1, further comprising attaching a signal a variable, and wherein at least one of an operator and a template is configured to set the signal to indicate failure, and at least one template is configured to trigger a global signal upon receipt of a variable having an attached signal set to indicate failure.

17. The process of claim 16, wherein at least one operator is configured to propagate the signal to a result variable when the variable having an attached signal is used as operand.

18. The process of claim 1, wherein the pre-certified application executing the safety-critical software compilation on the certified hardware device is configured for black box integration testing of the high-level requirements.

* * * * *